United States Patent
Nishizawa

(10) Patent No.: US 7,252,796 B2
(45) Date of Patent: Aug. 7, 2007

(54) EJECTING LOAD MONITORING METHOD FOR INJECTION MOLDING MACHINE

(75) Inventor: Makoto Nishizawa, Numazu (JP)

(73) Assignee: Toshiba Machine Co., Ltd., Tokyo (JP)

( * ) Notice: Subject to any disclaimer, the term of this patent is extended or adjusted under 35 U.S.C. 154(b) by 34 days.

(21) Appl. No.: 10/962,610

(22) Filed: Oct. 13, 2004

(65) Prior Publication Data

US 2005/0082708 A1  Apr. 21, 2005

(30) Foreign Application Priority Data

Oct. 16, 2003 (JP) ............................. 2003-356581

(51) Int. Cl.
*B29C 45/40* (2006.01)
*B29C 45/76* (2006.01)

(52) U.S. Cl. ...................... 264/40.1; 264/334; 425/139

(58) Field of Classification Search ............... 264/40.1, 264/40.5, 334; 425/139, 556, 444
See application file for complete search history.

(56) References Cited

U.S. PATENT DOCUMENTS

| | | | |
|---|---|---|---|
| 5,639,486 A * | 6/1997 | Yamaguchi | 425/139 |
| 6,398,536 B2 * | 6/2002 | Onishi | 425/139 |
| 6,527,534 B1 * | 3/2003 | Kamiguchi et al. | 425/139 |
| 6,533,972 B1 * | 3/2003 | Stirn | 264/40.5 |
| 6,616,872 B2 * | 9/2003 | Kamiguchi et al. | 264/40.1 |
| 6,669,877 B2 * | 12/2003 | Matsubayashi et al. | 264/40.1 |
| 6,906,631 B2 * | 6/2005 | Yamazaki et al. | 264/40.1 |
| 2004/0051194 A1 * | 3/2004 | Yamazaki et al. | 264/40.1 |

FOREIGN PATENT DOCUMENTS

| | | |
|---|---|---|
| DE | 101 33 442 A1 | 2/2002 |
| DE | 601 02 200 T2 | 7/2004 |

* cited by examiner

*Primary Examiner*—Jill L. Heitbrink
(74) *Attorney, Agent, or Firm*—DLA Piper US LLP

(57) ABSTRACT

A movable die is held on the front face of a movable platen. Ejector pins are incorporated in the movable die. An ejector unit that is provided with an ejector plate, actuator rods, etc., is mounted on the back of the movable platen. In ejecting a molded product from a die face, the ejector plate is advanced to cause the actuator rods to push out the ejector pins. In the ejecting load monitoring method of the invention, a plurality of monitoring sections are provided in a movement area of the ejector plate (or the actuator rod), and an upper limit value of a forward thrust load of the ejector plate is previously set for each monitoring section. An alarm is issued when the forward thrust load of the ejector plate reaches the upper limit value set for any of the monitoring sections during the ejecting operation.

3 Claims, 6 Drawing Sheets

EJECTING LOAD MONITORING METHOD FOR INJECTION MOLDING MACHINE

CROSS-REFERENCE TO RELATED APPLICATIONS

This application is based upon and claims the benefit of priority from prior Japanese Patent Application No. 2003-356581, filed Oct. 16, 2003, the entire contents of which are incorporated herein by reference.

BACKGROUND OF THE INVENTION

1. Field of the Invention

The present invention relates to a monitoring method carried out when a molded product is ejected from a die in an injection molding machine.

2. Description of the Related Art

In an electric injection molding machine, a molded product is ejected from a die by ejector pins incorporated in the die when it is recovered. As the product is ejected, the torque of a servomotor used as a drive source for the ejector pins is monitored. An alarm is issued if it is recognized that abnormal situation has occurred when the torque value deviates from a predetermined allowable range. More specifically, the torque of the servomotor is detected from the start to the end of the ejecting operation, and an alarm is issued if the detected torque deviates from the allowable range.

In the case of a conventional injection molding machine, the aforesaid monitoring of the ejecting load is carried out for the entire period of ejecting processes. If the shape of the product, and therefore, that of the die are complicated, for example, torque fluctuation caused as the product is ejected from the die is influenced by the positional relationship between the product and the die and the force of inertia that acts on the ejector unit as the ejecting speed changes. Accordingly, fluctuations of the ejecting load attributable to specific abnormal situations to be determined cannot be detected accurately.

BRIEF SUMMARY OF THE INVENTION

The present invention has been made in consideration of the above drawback of the conventional ejecting load monitoring method for an electric injection molding machine. The object of the invention is to provide an ejecting load monitoring method capable of more reliably detecting an abnormal situation during operation for ejecting a molded product without entailing a substantial reduction in productivity.

According to the invention, there is provided an ejecting load monitoring method for an injection molding machine which comprises a movable die having an ejector pin therein, a movable platen which holds the movable die, and an ejector unit having an actuator rod, the actuator rod is attached to the back side of the movable platen and is used to advance the ejector pin to eject a molded product from a die face, the method comprising: providing a plurality of monitoring sections in a movement area of the actuator rod; previously setting an upper limit value of a forward thrust load of the actuator rod for each monitoring section; and issuing an alarm when the forward thrust load of the actuator rod reaches the upper limit value set for any of the monitoring sections during ejecting operation.

According to the ejecting load monitoring method of the invention, the monitoring sections can be provided in the movement area of the actuator rod, depending on the position of each member of an ejection mechanism in the die or the nature of anticipated abnormal situations during the ejection of molded products. Also, the upper limit value of the forward thrust load of the actuator rod can be set in advance for each monitoring section. Thus, the occurrence of abnormal situations during the ejecting operation can be detected more reliably.

Preferably, in the method of the invention a first monitoring mode and a second monitoring mode are alternatively selectable for each monitoring section, in the first monitoring mode an advance action of the actuator rod is stopped the moment an alarm is issued, and in the second monitoring mode the number of alarms issued in each monitoring section is counted and the advance action of the actuator rod is stopped when the number of issued alarms for each monitoring section reaches a preset value.

With this arrangement, the possibility can be reduced that the ejector unit will be stopped due to erroneous recognition of an abnormal situation, and the occurrence of abnormal situations can be detected more reliably.

The number of issued alarms is counted with every data sampling period for detecting the forward thrust load in a control loop in a manner such that the count is incremented when the upper limit or higher value of the forward thrust load is detected. Obtained values for the individual sampling periods are summed.

According to the ejecting load monitoring method of the invention, the occurrence of abnormal situations during the ejecting operation can be detected more reliably, so that the producibility of the ejector unit can be enhanced, and the possibility of damage to the dies or mixing of defective molded products in nondefective product lots can be reduced.

Preferably, the thrust load of the actuator rod is also monitored in the aforesaid manner when the actuator rod retreats after reaching its advance limit.

DETAILED DESCRIPTION OF THE INVENTION

Figure 1:
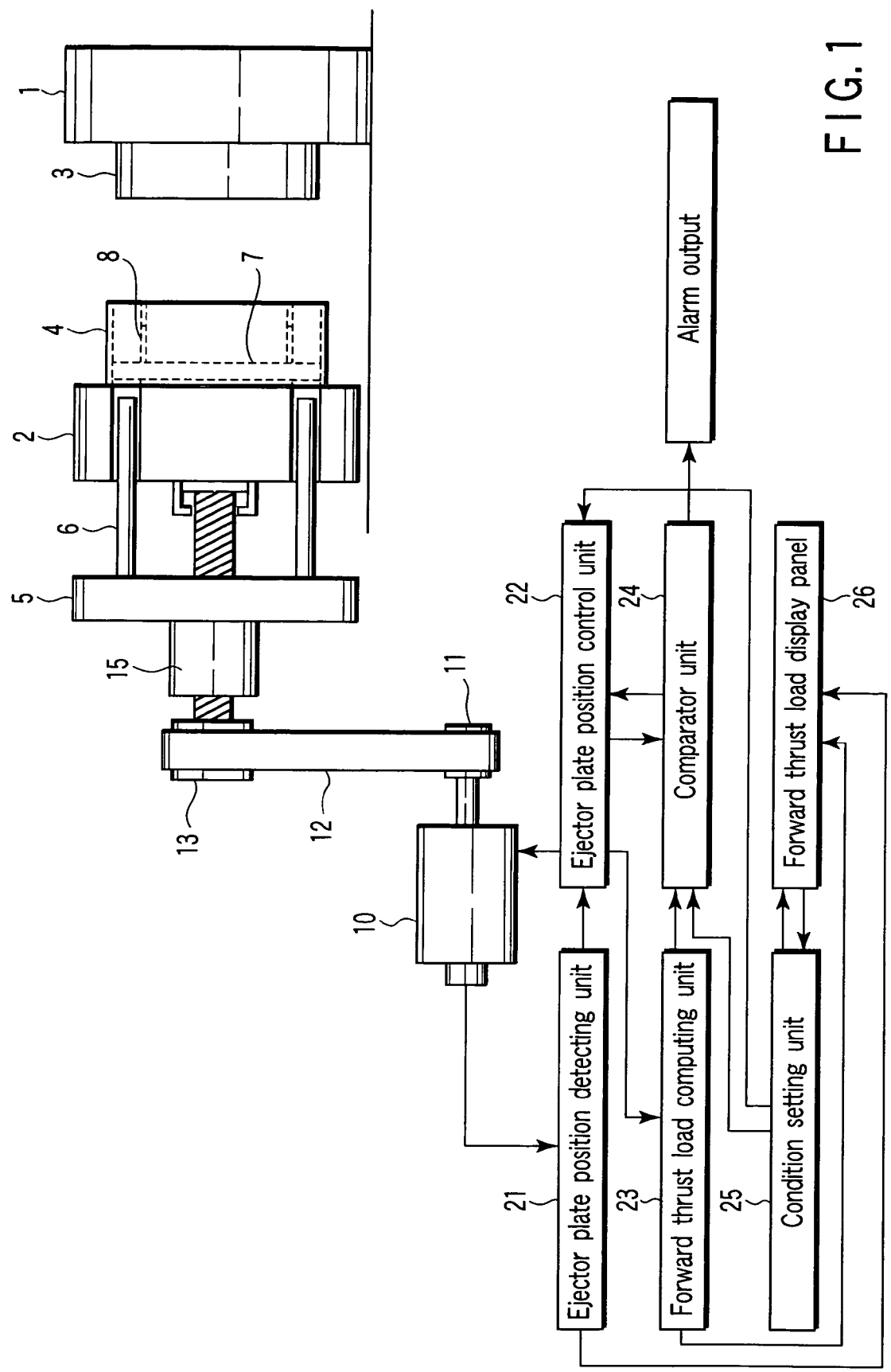
FIG. 1 is a diagram showing an outline of an injection molding machine with a motor-driven ejector unit to which an ejecting load monitoring method according to an embodiment of the invention is applied.

FIG. 1 shows a system diagram for the case where an ejecting load monitoring method according to an embodiment of the present invention is applied to an injection molding machine with a motor-driven ejector unit.

A stationary die 3 is held on the front face of a stationary platen 1, and a movable die 4 on the front face of a movable platen 2. Ejector pins 8 for ejecting a molded product from a die face and an intermediate plate 7 are incorporated in the movable die 4. The rear end portion of each ejector pin 8 is fixed to the intermediate plate 7. The pins 8 and the plate 7 can move back and forth (from side to side in FIG. 1) in the movable die 4.

The ejector unit for driving the ejector pins 8 is attached to the back of the movable platen 2. The ejector unit is composed of a ball screw 15, ejector plate 5, actuator rods 6, servomotor 10, etc. The ejector plate 5 is located opposite the back of the movable platen 2 so as to extend parallel to the platen 2. The actuator rods 6 are fixed to the front side of the plate 5. The rods 6 are housed individually in through holes in the movable platen 2. A pulley 11 is mounted on the extreme end of the shaft of the servomotor 10, and a pulley 13 on the rear end of a rod portion of the ball screw 15. The pulleys 11 and 13 are linked together by a timing belt 12. The ejector plate 5 is connected to a nut portion of the ball screw 15. If the actuator rods 6 are advanced by means of the plate 5, the respective distal ends of the rods 6 run against the back of the intermediate plate 7 in the movable die 4. Thereupon, the plate 7 is advanced to push the ejector pins 8 out and forward.

A control system for the ejector unit comprises an ejector plate position detecting unit 21, ejector plate position control unit 22, forward thrust load computing unit 23, comparator unit 24, condition setting unit 25, forward thrust load display panel 26, etc.

The condition setting unit 25 sets conditions for ejecting load monitoring, that is, monitoring sections and an upper limit value of forward thrust load of the ejector plate 5 for each monitoring section (i.e., the sum total of the forward thrust loads of the actuator rods 6). The set conditions are displayed on the forward thrust load display panel 26. The ejector plate position detecting unit 21 detects the position of the ejector plate 5 (and therefore, the position of each actuator rod 6) from the rotation of the servomotor 10, and transmits the detected value to the ejector plate position control unit 22 and the display panel 26.

Based on a command current that is delivered from the ejector plate position control unit 22 to the servomotor 10, the forward thrust load computing unit 23 calculates the forward thrust load of the ejector plate 5 and sends the result to the comparator unit 24 and the forward thrust load display panel 26. The forward thrust load of the ejector plate 5 is calculated according to the following expression:

$$P=(TQC \cdot BPN \cdot I)/(BL \cdot MPN),$$

where P is the forward thrust load of the ejector plate 5; TQC, the torque constant of the servomotor; BL, the lead of the ball screw; MPN, the number of teeth of the servomotor-side pulley; BPN, the number of teeth of the screw-side pulley; and I, the command current to the servomotor.

The ejector plate position control unit 22 controls the driving current for the servomotor 10 in response to commands that are delivered from the condition setting unit 25 and the comparator unit 24. The driving current (upper limit current value) for the servomotor that corresponds to the upper limit value of the forward thrust load for each monitoring section set by the condition setting unit 25 is calculated according to the following expression:

$$IL=(PS \cdot BL \cdot MPN)/(TQC \cdot BPN),$$

where IL is the upper limit current value of the servomotor and PS is the upper limit value of the forward thrust load for each monitoring section.

The comparator unit 24 compares the detected value of the forward thrust load delivered from the forward thrust load computing unit 23 with the upper limit value of the forward thrust load for each monitoring section delivered from the condition setting unit 25. As a result, an alarm is issued if the forward thrust load of the ejector plate 5 is greater than or equal to the upper limit value. If the conditions require the ejector unit to be stopped, a command is sent to the ejector plate position control unit 22 to stop the servomotor 10 immediately.

The forward thrust load display panel 26 displays on its display section the relationship between the positions of the ejector plate 5 delivered from the ejector plate position detecting unit 21 and the forward thrust load delivered from the forward thrust load computing unit 23. It also displays the monitoring sections set in the condition setting unit 25 and the upper limit value of the forward thrust load for each monitoring section.

Figure 2A:
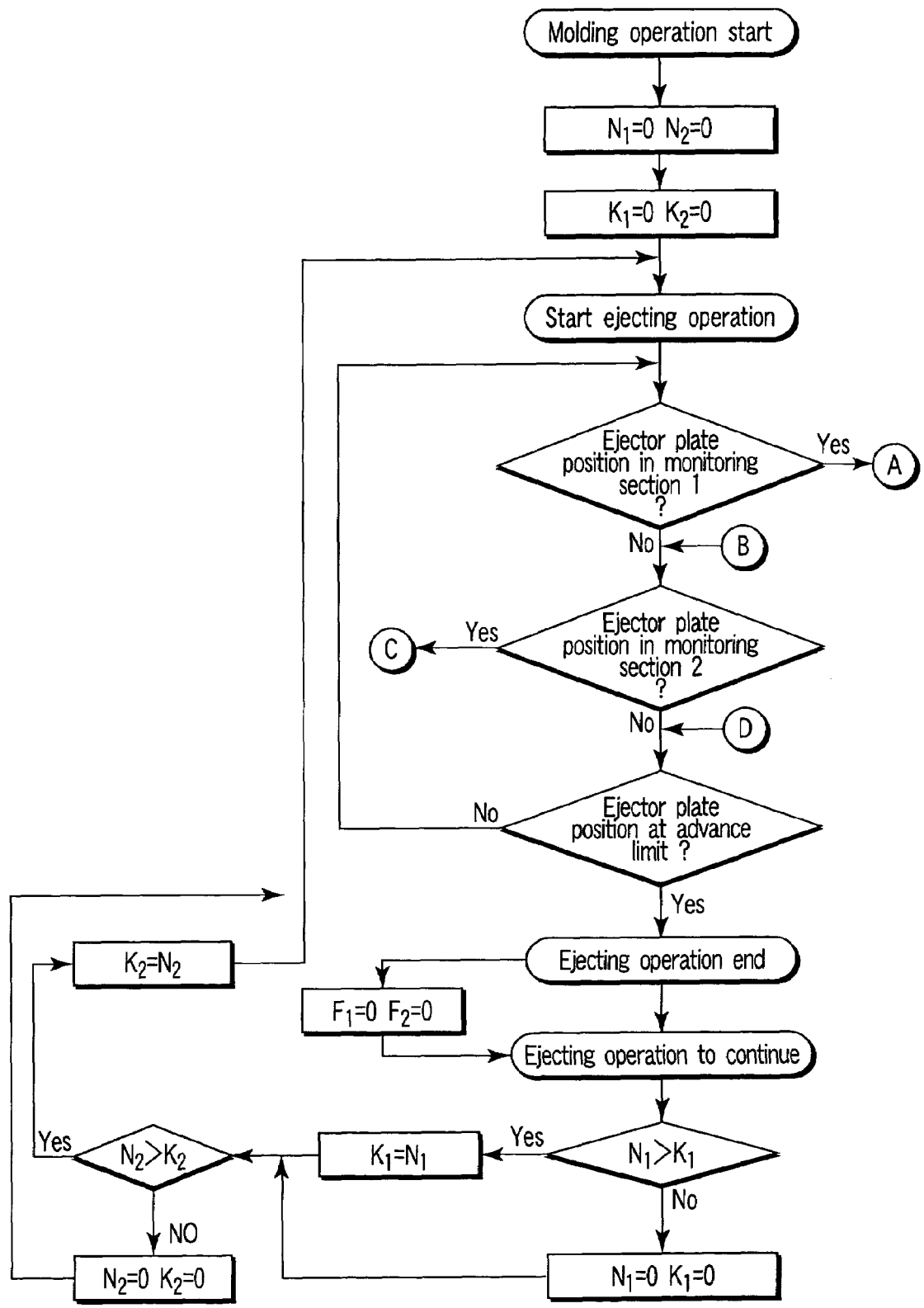
FIGS. 2A and 2B is a flowchart showing an example of the ejecting load monitoring method.
Figure 2B:
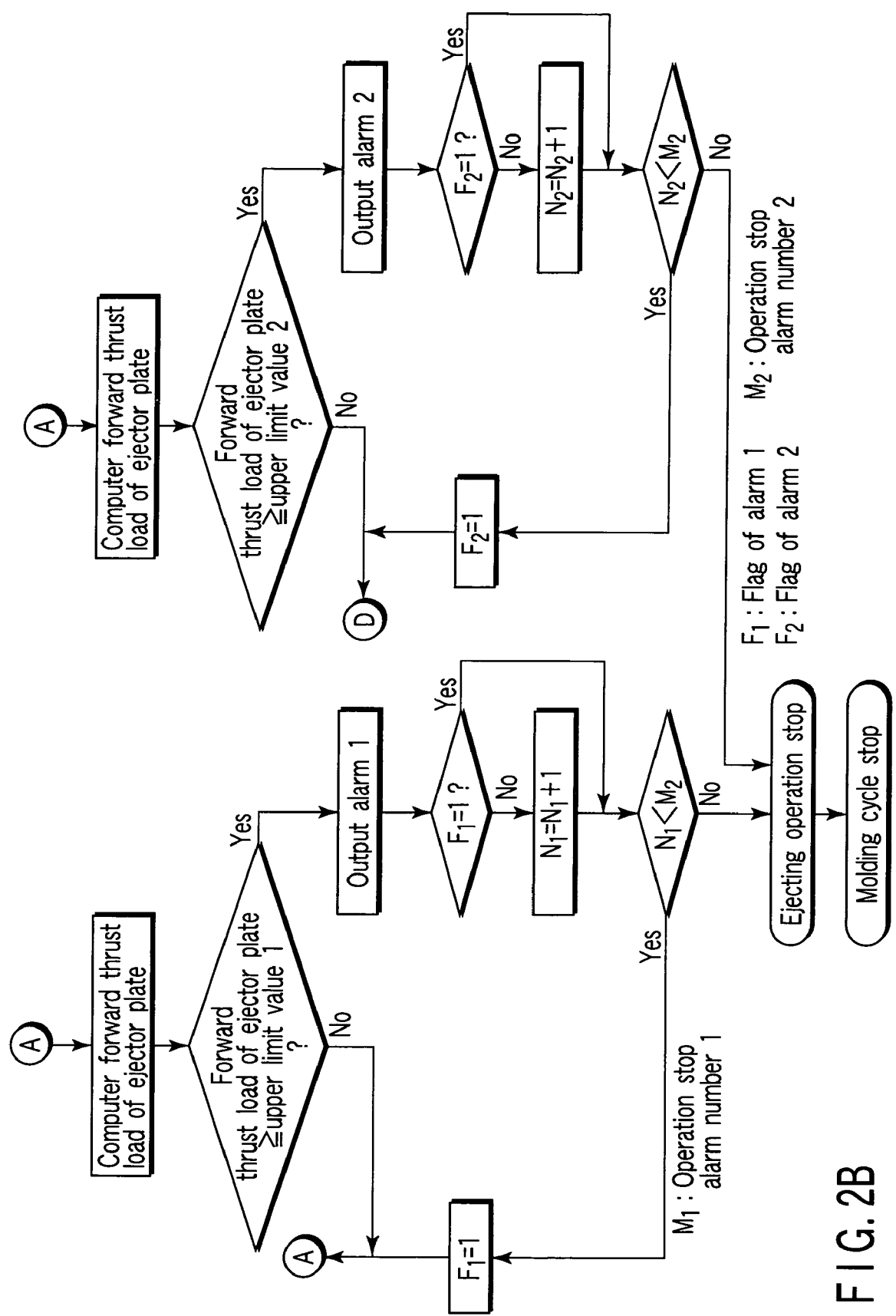

FIGS. 2A and 2B is a flowchart showing an example of the ejecting load monitoring method according to the present invention.

In starting a molding cycle, values in an issued alarm counter Ni and an alarm series counter Ki are first zeroed.

When a step of an ejecting operation is started, the position of the ejector plate is monitored with every data sampling period, and it is determined whether or not the ejector plate is in any of the monitoring sections. If the ejector plate is in none of the monitoring sections, it is determined whether or not an advance limit has been reached by the ejector plate. If the advance limit has not been reached, the program returns to a first step of the data sampling period. If the advance limit has been reached by the ejector plate, the ejecting operation is terminated, whereupon the program advances to the rest step in the molding cycle.

If the ejector plate is in any of the monitoring sections, the forward thrust load of the ejector plate is calculated from the current drawn by the servomotor. Then, it is determined whether the forward thrust load of the ejector plate is greater than or equal to the upper limit value that is previously set for each monitoring section. If the forward thrust load of the ejector plate is lower than the preset upper limit value, it is determined whether or not the advance limit has been reached by the ejector plate. Depending on the resulting decision, subsequent processes are carried out in accordance with the aforementioned procedure.

If the forward thrust load of the ejector plate is greater than or equal to the upper limit value, an alarm is issued, and 1 is added to the value in the counter Ni. Then, it is determined whether or not the value in the counter Ni is lower than a limit value Mi (operation stop alarm number) that is previously set for each monitoring section. If the value in the counter Ni is lower than the limit value Mi, it is determined whether or not the advance limit has been reached by the ejector plate. Depending on the resulting decision, subsequent processes are carried out in accordance with the aforementioned procedure. If the limit value Mi has been reached by the value in the counter Ni, on the other hand, the ejecting operation is stopped, and moreover, the molding cycle is stopped.

Figure 3:
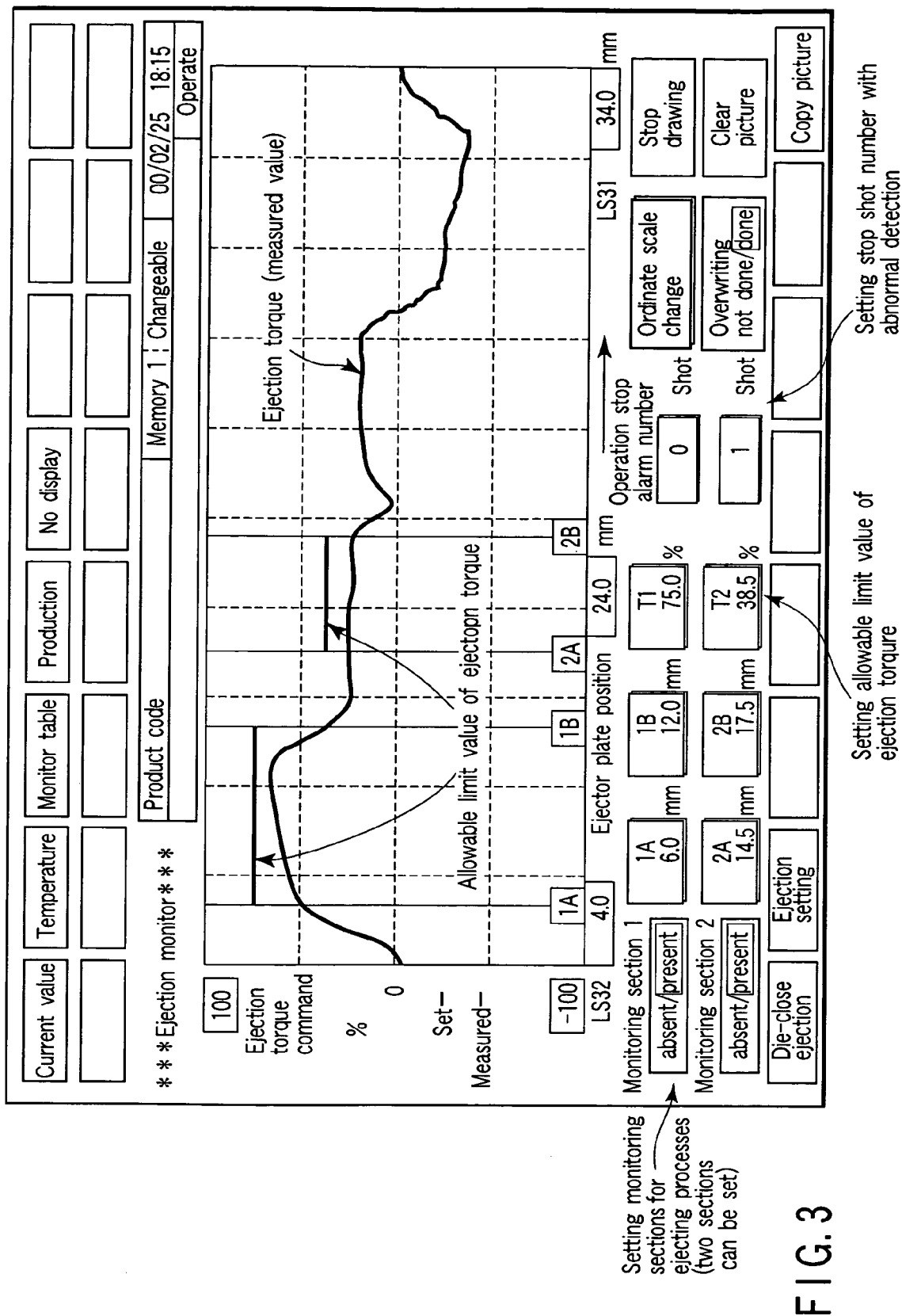
FIG. 3 is a diagram showing an example of an image displayed on a graphic display panel of a control console when an ejecting operation is performed normally using the ejecting load monitoring method of the invention.
Figure 4:
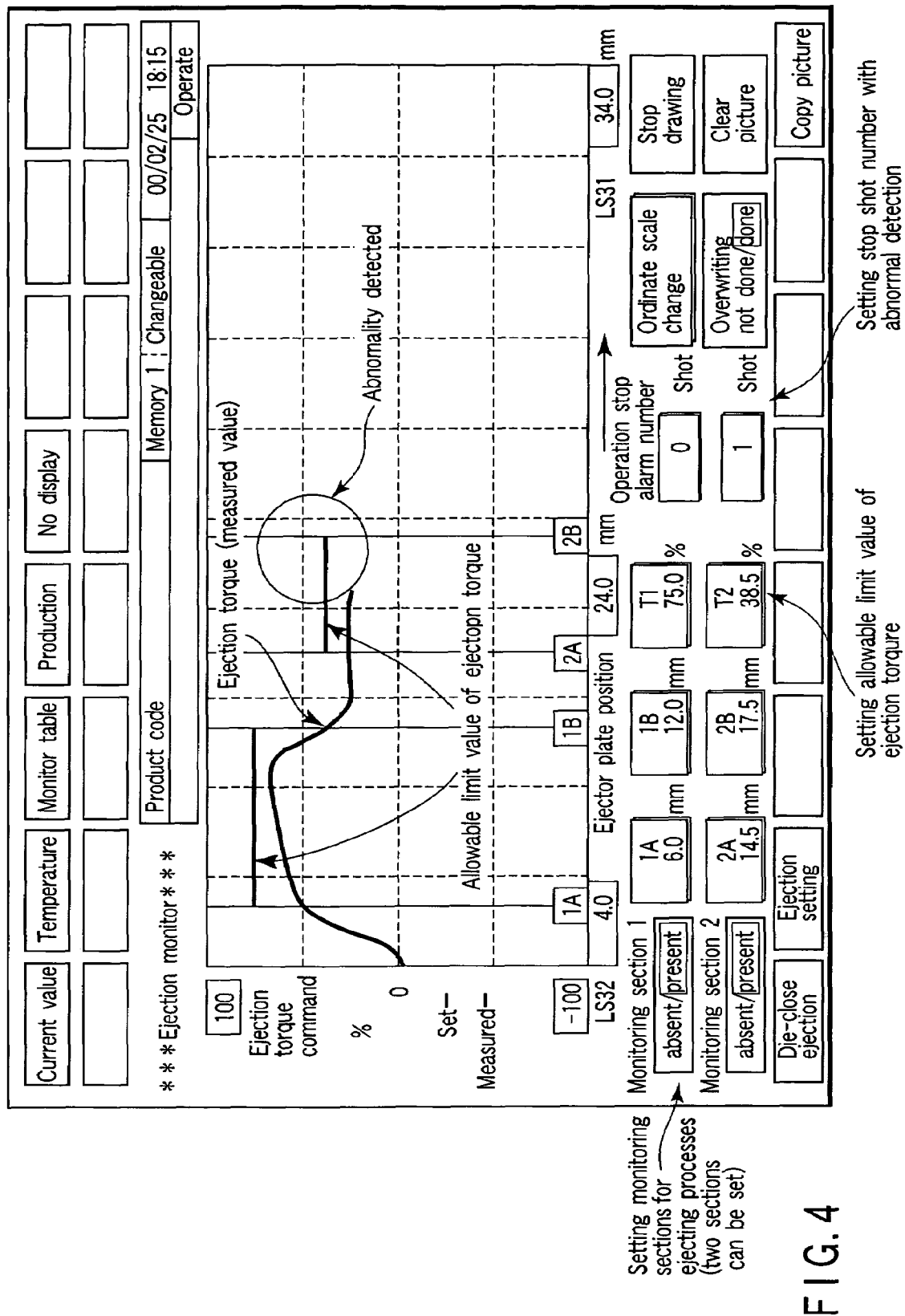
FIG. 4 is a diagram showing an example of an image displayed on the graphic display panel of the control console in the case of an abnormality occurring in the course of the ejecting operation using the ejecting load monitoring method of the invention.

FIGS. 3 and 4 show examples of images displayed on a graphic display panel of a control console when using the ejecting load monitoring method according to the invention. FIG. 3 shows an image displayed when the ejecting operation is performed normally, while FIG. 4 shows an image displayed in the case of an abnormality occurring in the course of the ejecting operation.

FIGS. 3 and 4 graphically show measurement data on the forward thrust load of the ejector plate (ordinate: ejection torque) compared with the position of the ejector plate (abscissa: ejector plate position). The left-hand end of each graph corresponds to a retreat limit of the ejector plate, and the right-hand end corresponds to the advance limit. Displayed on the same display image, moreover, are a plurality of monitoring sections (monitoring sections 1: 1A to 1B, monitoring sections 2: 2A to 2B) in a movement area of the ejector plate and the upper limit value of the forward thrust load of the ejector plate 5 that is set for each monitoring section.

If the forward thrust load of the ejector plate is lower than the preset upper limit value in any of the monitoring sections during the ejecting operation, the ejecting operation is carried out to the end, as shown in FIG. 3. If the forward thrust load of the ejector plate is greater than or equal to the preset upper limit value in any of the monitoring sections in the course of the ejecting operation, on the other hand, an alarm is output, as shown in FIG. 4. When the preset operation stop alarm number is reached by the number of output alarms, the ejecting operation is terminated.

According to the ejecting load monitoring method of the present invention, a plurality of monitoring sections can be provided in the movement area of the ejector plate, depending on the position of each member of an ejection mechanism in the die or the nature of anticipated abnormal situations during the ejection of molded products. Also, the upper limit value of the forward thrust load of the ejector plate can be set for each monitoring section. Thus, the occurrence of abnormal situations in the middle of the ejecting operation can be detected more reliably, so that the producibility of the ejector unit can be enhanced, and the possibility of damage to the dies or mixing of defective molded products in nondefective product lots can be reduced.

Figure 5:
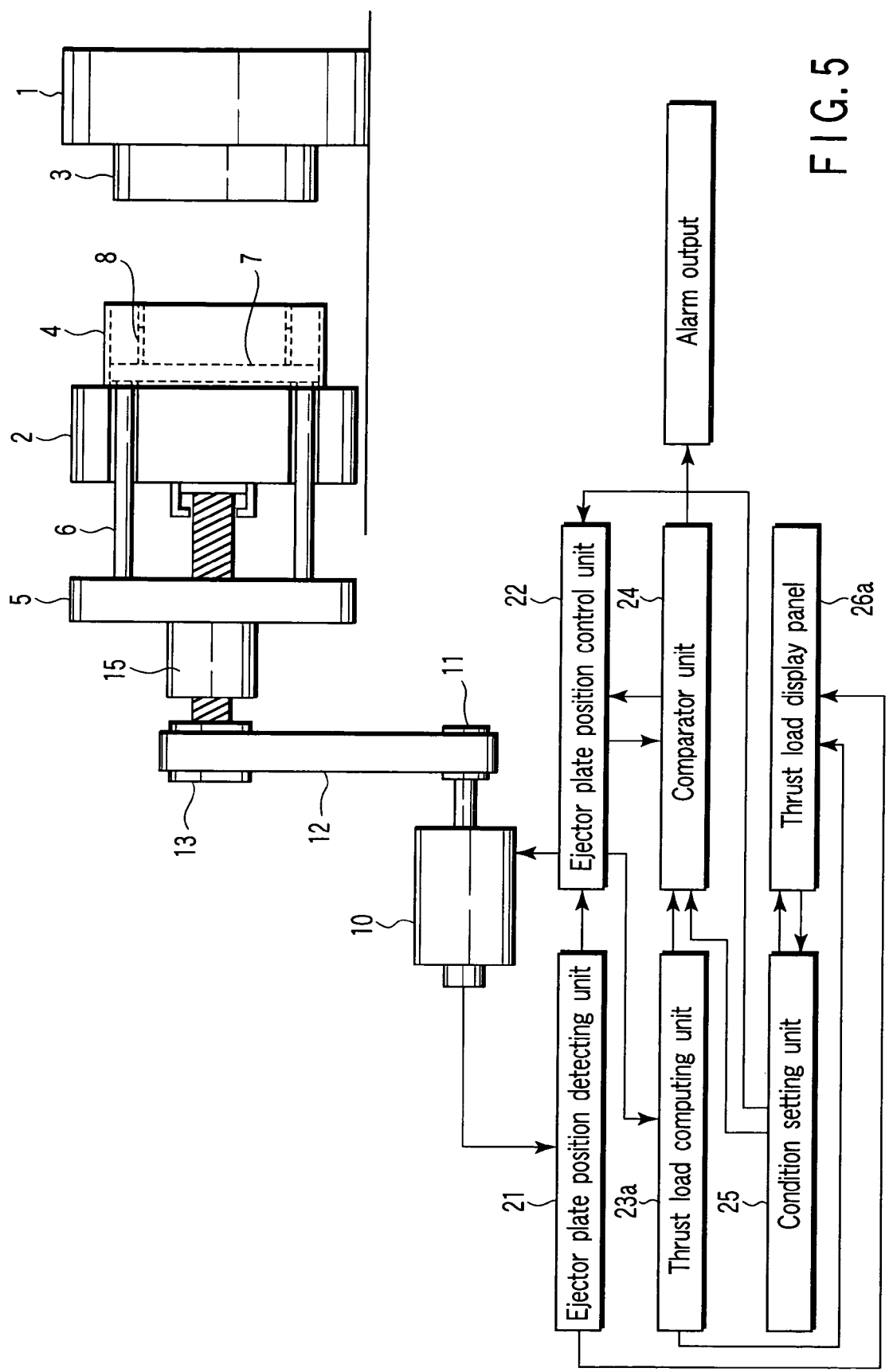
FIG. 5 is a diagram showing an outline of an injection molding machine to which an ejecting load monitoring method according to another embodiment of the invention is applied.

FIG. 5 shows an outline of an injection molding machine to which an ejecting load monitoring method according to another embodiment of the invention is applied.

In an ejector unit according to this embodiment, unlike the foregoing ejector unit shown in FIG. 1, the respective distal ends of actuator rods 6 are connected to an intermediate plate 7. As the actuator rods 6 retreat after reaching their advance limit, therefore, ejector pins 8 are forcibly pulled back together with the intermediate plate 7. If a molded product is adhered to the distal ends of the ejector pins 8 of this unit, it can be smoothly recovered by being separated from the pins.

Preferably, the unit of this embodiment also monitors the thrust load of the actuator rods 6 in the same manner for the advance as for the retreat of the actuator rods. Thus, it can detect the occurrence of abnormal situations at the start and in the middle of the retreat action.

What is claimed is:

1. An ejecting load monitoring method for an injection molding machine which comprises a movable die having an ejector pin therein, a movable platen which holds the movable die, and an ejector unit having an actuator rod, the actuator rod is attached to the back side of the movable platen and is used to advance and/or retreat the ejector pin when ejecting a molded product from a die face, the monitoring method comprising:
  providing a plurality of advance monitoring sections in a movement area of the actuator rod for advance;
  providing one or more retreat monitoring sections in a movement area of the actuator rod for retreat after the actuator rod arrives at an advance limit;
  setting an upper limit value of a forward thrust load of the actuator rod for each monitoring section prior to monitoring the actuator rod in the movement area;
  setting an upper limit value of a thrust load of the actuator rod for each retreat monitoring section prior to monitoring the actuator rod in the movement area;
  issuing an alarm when the forward thrust load of the actuator rod reaches the upper limit value set for any of the advance monitoring sections during an advance operation; and
  issuing an alarm when the thrust load of the actuator rod reaches the upper limit value set for any of the retreat monitoring sections during a retreat operation.

2. An ejecting load monitoring method according to claim 1, which comprises:
  a first monitoring mode in which an advance action of the actuator rod is stopped the moment an alarm is issued; and
  a second monitoring mode in which the number of alarms issued in each monitoring section is counted and the advance action of the actuator rod is stopped when the number of issued alarms for each monitoring section reaches a preset value,
  the first and second monitoring sections being alternatively selectable for each monitoring section.

3. An ejecting load monitoring method according to claim 2, which comprises:
  a third monitoring mode in which a retreat action of the actuator rod is stopped the moment an alarm is issued; and
  a fourth monitoring mode in which the number of alarms issued in each retreat monitoring section is counted and the retreat action of the actuator rod is stopped when the number of issued alarms for each retreat monitoring section reaches a preset value,
  the third and fourth monitoring sections being alternatively selectable for each retreat monitoring section.

* * * * *